US008746624B2

(12) United States Patent
Birkenstock

(10) Patent No.: US 8,746,624 B2
(45) Date of Patent: Jun. 10, 2014

(54) BOUNDARY LAYER CONTROL SYSTEM AND METHODS THEREOF

(76) Inventor: David Birkenstock, Herndon, VA (US)

(*) Notice: Subject to any disclaimer, the term of this patent is extended or adjusted under 35 U.S.C. 154(b) by 1201 days.

(21) Appl. No.: 12/471,991

(22) Filed: May 26, 2009

(65) Prior Publication Data

US 2009/0289150 A1 Nov. 26, 2009

Related U.S. Application Data

(60) Provisional application No. 61/071,904, filed on May 23, 2008.

(51) Int. Cl.
*B64C 21/02* (2006.01)

(52) U.S. Cl.
USPC .............................. 244/204; 244/130; 244/209

(58) Field of Classification Search
USPC ......... 244/198, 200, 204, 130, 119, 207, 208, 244/209
See application file for complete search history.

(56) References Cited

U.S. PATENT DOCUMENTS

| | | | |
|---|---|---|---|
| 2,169,325 A | | 8/1939 | Novak |
| 2,408,632 A | * | 10/1946 | Griffith .......................... 244/209 |
| 2,554,187 A | | 5/1951 | Griffith |
| 3,077,321 A | * | 2/1963 | Dunham ...................... 244/12.1 |
| 3,406,929 A | | 10/1968 | Young |
| 3,556,443 A | * | 1/1971 | Kidwell ......................... 244/130 |
| 3,620,485 A | * | 11/1971 | Gelhard et al. ................. 244/29 |
| 4,674,717 A | * | 6/1987 | Loebert ........................... 244/207 |
| 4,718,620 A | * | 1/1988 | Braden et al. .................. 244/130 |
| 4,967,983 A | * | 11/1990 | Motts ............................... 244/30 |
| 5,099,685 A | * | 3/1992 | McLean et al. .................. 73/147 |
| 5,358,200 A | | 10/1994 | Onda |
| 5,480,110 A | * | 1/1996 | Lobert ........................... 244/130 |
| 5,908,175 A | * | 6/1999 | Magnes ......................... 244/119 |
| 6,581,873 B2 | * | 6/2003 | McDermott ..................... 244/25 |
| 7,150,434 B1 | * | 12/2006 | Bandyopadhyay ........... 244/130 |
| 7,614,588 B2 | * | 11/2009 | Birkenstock ................... 244/200 |
| 7,686,256 B2 | * | 3/2010 | Miller et al. ................... 244/198 |
| 8,070,098 B2 | * | 12/2011 | Guering ......................... 244/119 |
| 8,113,466 B2 | * | 2/2012 | Birkenstock .................. 244/130 |

(Continued)

FOREIGN PATENT DOCUMENTS

| | | |
|---|---|---|
| EP | 1577212 A2 | 9/2005 |
| FR | 737957 | 12/1932 |

(Continued)

OTHER PUBLICATIONS

P.N. Peraudo et al. "Computational Study of the Embedded Engine Static Pressure Thrust Propulsion System". American Institute of Aeronautics and Astronautics.

(Continued)

*Primary Examiner* — Benjamin P Lee
(74) *Attorney, Agent, or Firm* — Maier & Maier, PLLC

(57) ABSTRACT

An airfoil boundary layer control system may be provided. The airfoil boundary layer control system may include at least one airfoil that may include a first surface and a second surface coupled together at a leading edge and a trailing edge; at least one hollow chamber defined within the at least one airfoil; and an aperture defined in the airfoil and positioned substantially near the trailing edge, the aperture coupled in flow communication with the at least one hollow chamber; a pressure source coupled in flow communication with the at least one hollow chamber.

6 Claims, 4 Drawing Sheets

(56) References Cited

U.S. PATENT DOCUMENTS

| | | | |
|---|---|---|---|
| 2002/0096599 A1* | 7/2002 | McDermott | 244/25 |
| 2002/0134891 A1* | 9/2002 | Guillot et al. | 244/199 |
| 2002/0139894 A1* | 10/2002 | Sorensen | 244/2 |
| 2008/0099611 A1* | 5/2008 | Martino Gonzalez et al. | 244/119 |
| 2009/0076787 A1* | 3/2009 | Birkenstock | 703/9 |
| 2009/0194640 A1* | 8/2009 | Birkenstock | 244/198 |
| 2009/0289150 A1* | 11/2009 | Birkenstock | 244/207 |
| 2009/0308973 A1* | 12/2009 | Guering | 244/58 |
| 2010/0078522 A1* | 4/2010 | Birkenstock | 244/209 |
| 2011/0024572 A1* | 2/2011 | Raymond et al. | 244/171.1 |
| 2011/0163207 A1* | 7/2011 | Chanez et al. | 244/53 B |

FOREIGN PATENT DOCUMENTS

| | | |
|---|---|---|
| FR | 958682 | 5/1950 |
| FR | 1181456 | 6/1959 |
| GB | 578763 | 7/1946 |
| WO | 83-00129 A1 | 1/1983 |
| WO | 2006-022833 A2 | 3/2006 |

OTHER PUBLICATIONS http://www.avinc.com/uas/adc/broomstick/.
http://www.archive.org/download/nasa_techdoc_19780078524/19780078524.pdf.
http://digitalcommons.calpoly.edu/cgi/viewcontent.cgi?article=1731&context=theses.
1 page from Supplementary European Search Report corresponding to European Patent Application No. 05 85 7227.
International Search Report dated Jan. 5, 2010 in corresponding international application No. PCT/US2009/045166, 3 pages.
Joshua Roepke, An Experimental Investigation of a Goldschmied Propulsor, in Partial Fulfillment of the Requirements for the Degree Master of Science in Aerospace Engineering, a Thesis Presented to the Faculty of California Polytechnic State University San Luis Obispo, Aug. 2012, 205 pages.

* cited by examiner

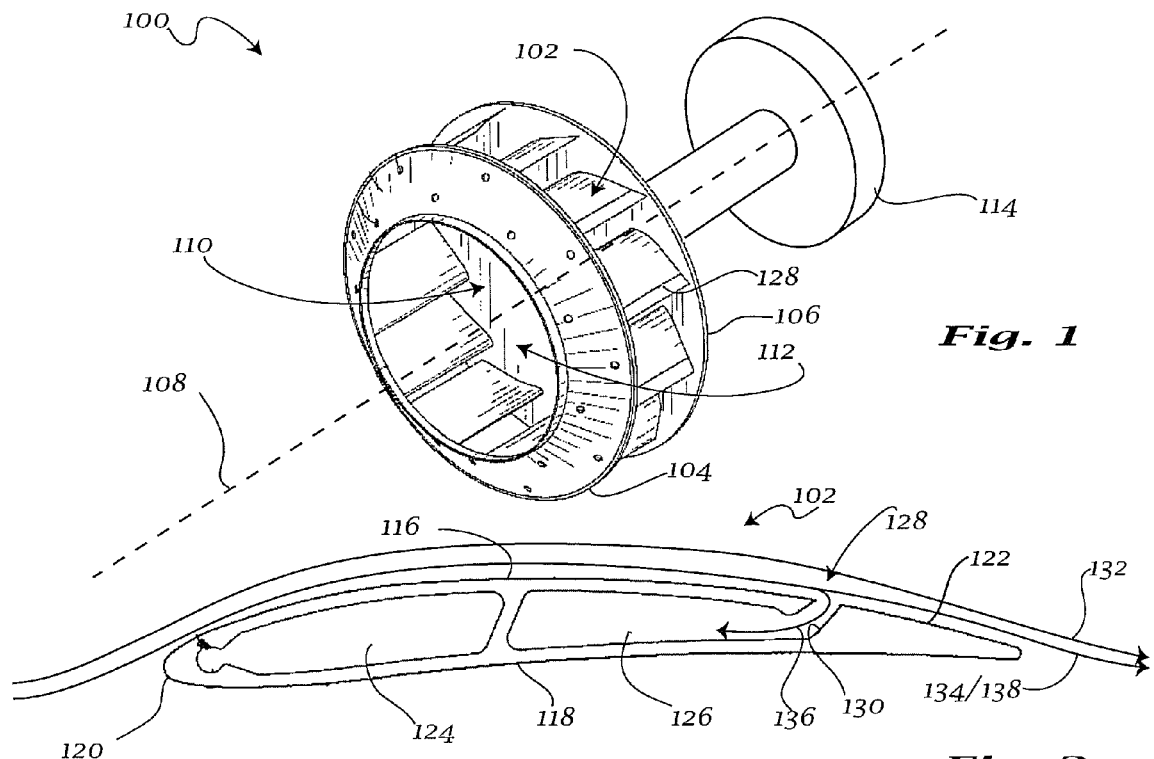
Fig. 1
Fig. 2
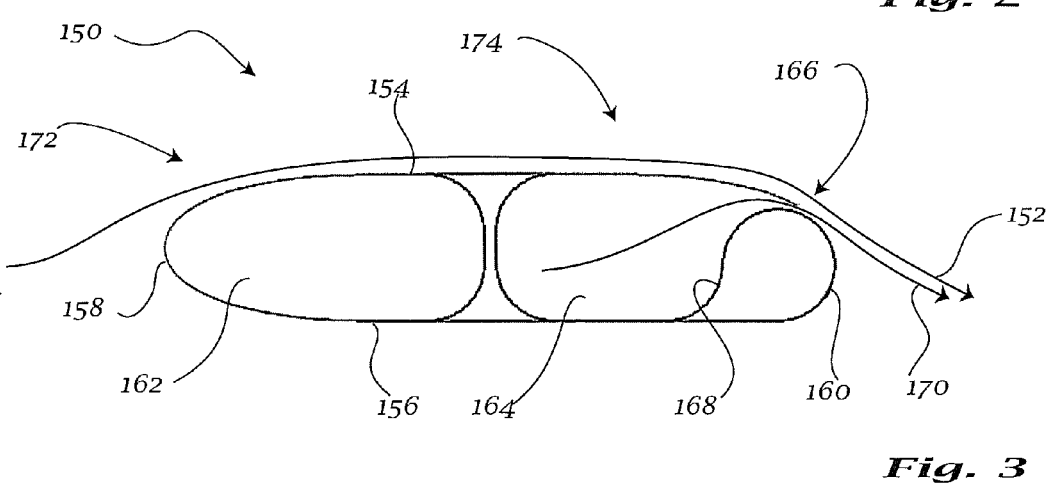
Fig. 3

BOUNDARY LAYER CONTROL SYSTEM AND METHODS THEREOF

CROSS-REFERENCE TO RELATED APPLICATIONS

This application claims priority to U.S. Provisional Application 61/071,904, filed May 23, 2008 and entitled BOUNDARY LAYER CONTROL SUCTION FAN AND METHODS THEREOF, the entire contents of which are hereby incorporated by reference.

BACKGROUND OF THE INVENTION

The general concept of pressure thrust is known in the fluid dynamics design art, to include airfoils, aircraft and submarines. The phenomenon uses energy of an airflow rushing past an airfoil or a surface, such as but not limited to a fuselage, to generate an area high pressure which exerts a force on the airfoil or the surface which pushes the airfoil or the surface in a substantially forward direction. In at least one example, the airflow is channeled against the airfoil to increase the pressure near the airfoil which increases the force pushing the airfoil in a substantially forward direction.

In the 1940s and 1950s the Griffith Aerofoil was developed. Researchers focused on very thick aerofoils, for use on span-loaded flying-wing transport and they proved a meaningful decrease in total power required for those designs. Fabio Goldschmied with help from Denis Bushnell at NASA uncovered and verified the pressure thrust phenomenon.

Moreover, the Coanda Effect is another concept that is known in the fluid dynamics design art. The Coanda Effect describes the phenomenon of how a fluid flow behaves when it is substantially adjacent a surface. Specifically, the Coanda Effect describes the tendency of a fluid flow to stay attached to a surface even if the surface curves away from an initial path of the fluid flow.

The general concept of airfoils is also known in the fluid dynamics design art. Specifically, it is known that convex surfaces facilitate accelerating a fluid flow that is adjacent the convex surface as the surface travels through a fluid medium. Conversely, a concave surface facilitates decreasing the speed of a fluid flow that is adjacent the concave surface as the surface travels through the fluid medium. This is the general concept behind pressure thrust, wherein a concave surface facilitates decreasing the airflow creating an area of above-ambient pressure. Aerodynamic lift is created when an airfoil, with an upper surface that may be convex, creates lower-than-ambient pressure above the upper surface. As a result, the pressure differential between the relatively high pressure area under the airfoil and the relatively low pressure area above the airfoil facilitates exerting a force on the airfoil that pushes, or lifts, the airfoil upwards.

The general concept of shockwaves is also known in the fluid dynamics design art. Specifically, shockwaves are produced during the transition of an object or a flow of fluid traveling at subsonic speeds to supersonic speeds, or vice versa. During transonic speeds of an aircraft, the airflow may have a velocity that is accelerated by surfaces such as, but not limited to airfoils and fuselages of the aircraft. As a result, when an aircraft is traveling at transonic speeds that are substantially below Mach 1.0, at least a portion of the airflow may be accelerated to speeds greater than Mach 1.0. As a result, a shockwave is produced. Moreover, when the velocity of the supersonic airflow is reduced to a velocity that is subsonic, a shockwave is also produced. This shockwave includes a high pressure area positioned substantially near the surface of the aircraft.

Boundary Layer Control ("BLC") methods are generally known in the aerodynamic arts. BLC methods are exploitable for increasing lift coefficients of airfoils, among other goals. Typically, BLC methods are exploited to control the boundary layer of air on the main wing of an aircraft. BLC methods applied to the main wing of an aircraft reduce drag thereon and increase the maximum the usable angle of attack and maximum attainable lift coefficient, which increases performance.

BRIEF DESCRIPTION OF THE INVENTION

In one embodiment, an airfoil boundary layer control system may be provided. The airfoil boundary layer control system may include at least one airfoil that may include a first surface and a second surface coupled together at a leading edge and a trailing edge; at least one hollow chamber defined within the at least one airfoil; and an aperture defined in the airfoil and positioned substantially near the trailing edge, the aperture coupled in flow communication with the at least one hollow chamber; a pressure source coupled in flow communication with the at least one hollow chamber.

In another embodiment, a fuselage boundary layer control system may be provided. The fuselage boundary layer control system may include an aircraft including a fuselage; a tail cone having a substantially conical shape and coupled to the fuselage such that an inlet is defined between the tail cone and the fuselage, the tail cone may include a first surface having a substantially concave shape; and a hollow chamber defined in the tail cone; and a pressure source coupled to tail cone and positioned within the hollow chamber, the pressure source coupled in flow communication with the inlet.

In yet another embodiment, a method of removing at least a portion of boundary layer air passing over an airfoil may be provided. The method may include providing an airfoil that includes at least one hollow chamber defined therein and an aperture defined on the airfoil and coupled in flow communication with the hollow chamber; creating a pressure within the hollow chamber using a pressure source in flow communication to the hollow chamber; and channeling air through the aperture using the pressure source.

In yet another embodiment, a method of removing at least a portion of boundary layer air passing over a fuselage of a craft may be provided, The method may include providing a substantially conical tail cone coupled to the fuselage, the tail cone includes a first concave surface and a pressure source coupled to the tail cone and positioned within a hollow chamber of the tail cone; and channeling at least a portion of a boundary layer air of an airflow into an inlet defined between the tail cone and the fuselage using the pressure source.

BRIEF DESCRIPTION OF THE DRAWINGS

Advantages of embodiments of the present invention will be apparent from the following detailed description of the exemplary embodiments. The following detailed description should be considered in conjunction with the accompanying figures in which:

FIG. 1 is a perspective view of an exemplary BLC-augmented suction fan;

FIG. 2 is a cross-sectional view of an exemplary airfoil that may be used with the suction fan shown in FIG. 1;

FIG. 3 is a cross-sectional view of an alternative airfoil that may be used with the suction fan shown in FIG. 1;

DETAILED DESCRIPTION OF THE INVENTION

Figure 4:
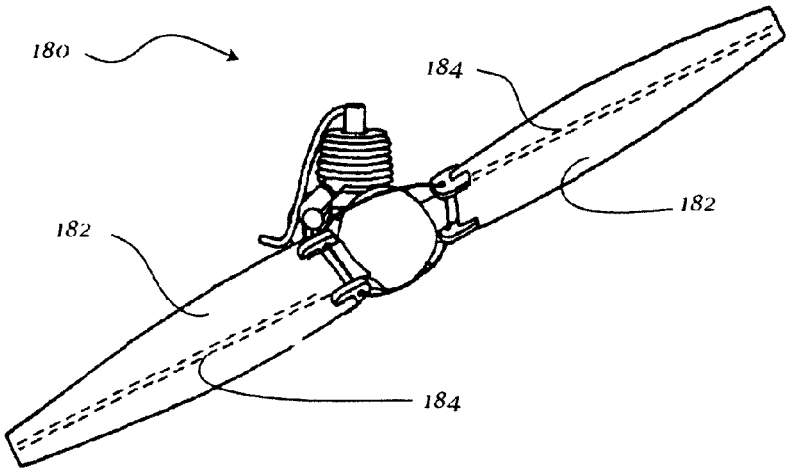
FIG. 4 is a perspective view of an exemplary BLC-augmented propeller.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

A general explanation of some of the theories that may be involved with at least one of the exemplary embodiments described herein may be explained in: Goldschmied, F. R., "Airfoil Static-Pressure Thrust: Flight-Test Verification," AIAA Paper 90-3286, September 1990 the contents of which are hereby incorporated by reference in their entirety. Additional documentation can be found, for example, in Richards, E. J. and Burge, C. H. "An Airfoil Designed to Give Laminar Flow Over the Whole Surface with Boundary-Layer Suction," A.R.C. RBM 2263, June 1943; Richards, E. J., Walker W. S. and Greening J. R., "Tests of a Griffith aerofoil in the 13 ft.×9 ft. wind tunnel part 1, part 2, part 3, part 4, lift, drag, pitching moments and velocity distribution," ARC/R&M-2148 ARC-7464 ARC-7561 ARC-8054 ARC-8055, 1944 and Richards, E. J., Walker, W. S. and Taylor, C. R., "Wind-Tunnel Tests on a 30% Suction Wing" A.R.C. RBM 2149, July 1945, "Incompressible Aerodynamics" B. Thwaites, Dover, 1960, http://web.mit.edu/16.unified/www/ FALL/ BreguetNotes.pdf, as viewed on Dec. 21, 2005, and http:// web.mit.edu/16.unified/www/SPRING/propulsion/Unified-Propulsion4/UnifiedPropulsion4.htm, as viewed Dec. 21, 2005, and "Personal Aircraft Drag Reduction," by Bruce H. Carmichael (Capistrano Beach, Calif.: Carmichael, 1995), the contents of which are hereby incorporated by reference in their entirety.

Other general explanation of some of the theories that may be involved with at least one of the exemplary embodiments described herein may be explained in: "NASA LaRC Turbine-Electric Advanced Concept" Mark D. Moore NASA Langley Research Center, 2009; "An Experimental Evaluation of a Low Propulsive Power, Discrete Suction Concept Applied to an Axisymmetric Vehicle" Harvey J. Howe and Benjamin J. Neumann, January 1982 (report number DTNSRDC/TM-16-82/02); "Aerodynamic Design of Low-Speed Aircraft With a NASA Fuselage/Wake-Propeller Configuration" F. R. Goldschmied, AIAA paper 86-2693; "On the Aerodynamic Optimization of Mini-RPV and Small GA Aircraft" F. R. Goldschmied, AIAA paper 84-2163; "Jet-Propulsion of Subsonic Bodies with Jet Total-Head Equal to Free Stream's" F. R. Goldschmied, AIAA paper 83-1790; "Wind Tunnel Demonstration of an Optimized LTA System With 65% Power Reduction and Neutral Static Stability" Fabio R, Goldschmied, AIAA paper 83-1981; "Aerodynamic Hull Design for HASPA LTA Optimization" Fabio R. Goldschmied, Journal of AIRCRAFT VOL. 15, NO. 9, page 634; "Comment on "LTA Aerodynamic Data Revisited" F. R. Goidschmied, Journal of AIRCRAFT VOL. 14, NO. 6, page 608; "An Approach to Turbulent Incompressible Separation under Adverse Pressure Gradients" FABIO R. GOLDSCHMIED, Journal of AIRCRAFT VOL. 2, NO. 2, page 108; "An Approach to Turbulent Incompressible Separation and the Determination of Skin-Friction Under Adverse Pressure Gradients" FABIO R. GOLDSCHMIED, AIAA Paper No. 64-465; "Integrated Hull Design, Boundary-Layer Control, and Propulsion of Submerged Bodies" F. R. GOLDSCHMIED, J. HYDRONAUTTCS VOL. 1, NO. 1, page 2; and "Shaping of Axisymmetric Bodies for Minimum Drag in Incompressible Flow" Jerome S. Parsons, Raymond E. Goodson and Fabio R. Goldschmied, Journal of HYDRONAUTICS VOL. 8, NO. 3, page 100. (AIAA paper 48131-445), the contents of which are hereby incorporated by reference in their entirety.

Likewise U.S. Pat. No. 5,358,200 entitled "AIRSHIP" and U.S. Pat. No. 5,099,685 entitled "BOUNDARY LAYER CONTROL DIFFUSER FOR A WIND TUNNEL OR THE LIKE" describe related art.

FIG. 1 is a perspective view of a suction fan 100. FIG. 2 is a cross-sectional side view of an airfoil 102. Suction fan 100 may be used in, but not limited to, a centrifugal suction pump, a centrifugal compressor, an evacuator, an axial suction pump and an axial compressor. In the exemplary embodiment, suction fan 100 has been improved, or augmented, for boundary layer control ("BLC") to facilitate increasing the effectiveness of suction fan 100, as described in more detail below. In one embodiment, the BLC-augmented suction fan 100 may include an axially outer band 104 and an axially inner band 106, which are spaced an axial distance (not shown) apart along an axis of rotation 108. Axially outer and inner bands 104 and 106 are substantially annular and define a cavity 110. In one embodiment, axially inner band 106 includes an aperture 112 defined therein that facilitates channeling a fluid flow (not shown) towards cavity 110. A plurality of airfoils 102 may be coupled to axially outer and inner bands 104 and 106 such that airfoils 102 extend between outer band 104 and inner band 106. Moreover, the plurality of airfoils 102 may be circumferentially spaced-apart such that one airfoil 102 is circumferentially-spaced a distance from an adjacent second airfoil 102. Suction fan 100 may also include a pressure source 114 that is coupled in flow communication with the plurality of airfoils 102. In an alternative embodiment, airfoils 102 may be adjustable with respect to inner and outer bands 104 and 106 to facilitate increasing and decreasing a pressure differential, volume, and/or lift coefficient while keeping a rotational speed of suction fan 100 substantially constant.

In one embodiment, each airfoil 102 may be substantially identical. Moreover, each airfoil 102 may include a first surface 116 and a second surface 118, wherein first surface 116 defines a suction side of each airfoil 102, and second surface 118 defines a pressure side of each airfoil 102. First and second surfaces 116 and 118 may be coupled together at a leading edge 120 and at a radially-spaced trailing edge 122. As shown in FIG. 2, airfoil 102 may also have a first hollow chamber 124 defined therein and positioned substantially adjacent leading edge 120. Moreover, airfoil 102 may have a second hollow chamber 126 defined therein and positioned substantially adjacent trailing edge 122. In one embodiment, second hollow chamber 126 may include a suction inlet 128 that is coupled in fluid communication with second hollow chamber 126. Second hollow chamber 126 may be coupled in flow communication with pressure source 114, such that pressure source 114 facilitates channeling air from second hollow chamber 126 towards pressure source 114. As a result, air may be sucked in from outside airfoil 102, substantially near first surface 116. Suction inlet 128 may also include an inlet wall 130 that is sloped at an angle with respect to second surface 118, wherein inlet wall 130 facilitates ejecting foreign objects using centrifugal force, as described in more detail below.

During operation, suction fan 100 rotates about axis 108, which facilitates channeling air over airfoils 102 such that an airflow 132 is channeled from leading edge 120 to trailing edge 122. In an alternative embodiment, airflow 132 may be a flow of any type of fluid such as but not limited to, air, liquid and plasma. In the exemplary embodiment, airflow 132 passes over first and second surfaces 116 and 118 such that a substantially low pressure zone is created substantially near first surface 116 and a substantially high pressure zone is created substantially near second surface 118. Airflow 132 may include a boundary layer 134 of airflow that is positioned substantially near first surface 116. Boundary layer air 134 may flow at a slower velocity with respect to airflow 132 because boundary layer air 134 is contacting a surface, such as first surface 116. Pressure source 114 facilitates generating a negative pressure area within second hollow chamber 126 that facilitates sucking air from second hollow chamber 126 towards pressure source 114. As a result, air may be sucked, or channeled from outside airfoil 102 through suction inlet 128 into second hollow chamber 126 and towards pressure source 114. In such an embodiment, a first portion 136 of boundary layer air 134 may be channeled into suction inlet 128 and a small second portion 138 of boundary layer air 134 may continue to flow past airfoil 102. The removal of first portion 136 or boundary layer air 134 facilitates bending airflow 132 towards trailing edge 122 of airfoil 102, which facilitates increasing the lift coefficient and generating a higher pressure differential than a fan that does not remove a portion of the boundary layer air 134. As such, the BLC-augmented airfoil 102 facilitates increasing the effectiveness of suction fan 100 by increasing the maximum pressure differential generated by the fan. Moreover, in the event debris, such as but not limited to dirt, dust, particles and the like, is sucked into second hollow chamber 126, the orientation of inlet wall 130 facilitates ejecting the debris using centrifugal force. Specifically, the centrifugal force enables debris to be ejected from second hollow chamber 126 by traveling along inlet wall 130 and out of airfoil 102.

FIG. 3 is a cross-sectional side view of an alternative airfoil 150 that may be used in suction fan 100. The airfoil, shown in FIG. 3, is a general representation of one embodiment of an airfoil and is not intended to show all functioning elements of an airfoil. In one alternative embodiment, airfoil 150 may be used as, but not limited to, a wing, a fan blade, a rotor blade, a stator blade or any other airfoil known to a person having ordinary skill in the art. In the exemplary embodiment, airfoil 150 may be designed to utilize the Coanda Effect of an airflow 152 flowing past airfoil 150 during operation, as described in more detail below. Airfoil 150 may include a first surface 154 and a second surface 156, wherein first surface 154 defines a suction side of each airfoil 150, and second surface 156 defines a pressure side of each airfoil 150. First and second surfaces 154 and 156 may be coupled together at a leading edge 158 and at a trailing edge 160. In one embodiment, trailing edge 160 may have a substantially curved cross-sectional profile to facilitate utilizing the Coanda Effect. Moreover, airfoil 150 may also has a first hollow chamber 162 defined therein and positioned substantially adjacent leading edge 158. Airfoil 150 may also have a second hollow chamber 164 defined therein and positioned substantially adjacent trailing edge 160. In one embodiment, second hollow chamber 164 may include an outlet 166 that is coupled in fluid communication with second hollow chamber 164. Second hollow chamber 164 may be coupled in flow communication with pressure source 114, such that pressure source 114 facilitates channeling air from second hollow chamber 164 towards outlet 166. As a result, air may be channeled out of airfoil 150 towards first surface 154. Outlet 166 may also include an outlet wall 168 that is sloped at an angle with respect to second surface 156, wherein outlet wall 168 facilitates ejecting foreign objects using centrifugal force, as described in more detail below.

During operation, suction fan 100 rotates about axis 108, which facilitates channeling air over airfoils 150 such that airflow 152 is channeled from leading edge 158 to trailing edge 160. In an alternative embodiment, airflow 152 may be a flow of any type of fluid such as but not limited to, liquid and plasma. In the exemplary embodiment, airflow 152 passes over first and second surfaces 154 and 156 such that a substantially low pressure zone is created substantially near first surface 154 and a substantially high pressure zone is created substantially near second surface 156. Airflow 152 may include a boundary layer (not shown) of airflow that is positioned substantially near first surface 116. The boundary layer air may flow at a slower velocity than airflow 152 because the boundary layer air is contacting a surface, such as first surface 154. Pressure source 114 facilitates generating a positive pressure area within second hollow chamber 164 that facilitates pushing, or channeling an air stream 170 out of second hollow chamber 164 towards outlet 166. As a result, air stream 170 may be channeled out of airfoil 150 through outlet 166 onto first surface 154 and towards trailing edge 160. Due to the Coanda Effect, fluid, or air stream 170, traveling substantially near a surface will tend to stay attached to the surface even in the event the surface curves or deviates from the initial path of the airflow. In the exemplary embodiment, air stream 170 is channeled out of outlet 166 substantially near first surface 154, and more specifically trailing edge 160. As a result, air stream 170 will remain attached to trailing edge 160 and therefore bend around first surface 154 of trailing edge 160, to facilitate increasing the lift coefficient and the effectiveness of airfoil 150.

In one embodiment, airflow 152 is channeled over airfoil 150. As airflow 152 passes over first surface 154, due to the principle of lift, a velocity of airflow 152 is increased or energized in a front portion 172 of airflow 152. As airflow continues to pass over first surface 154, the velocity of airflow 152 decreases and airflow 152 is de-energized substantially near a rear portion 174 of airfoil 150. The channeling of air stream 170 out of outlet 166 facilitates re-energizing airflow 152, to enable airflow 152 to stay attached to first surface 154, which facilitates bending airflow 152 substantially towards trailing edge 160. This bending of airflow 152 towards trailing edge 160 facilitates increasing the lift coefficient and generating a higher pressure differential than a fan that does not channel air stream 170 out of outlet 166. As such, the BLC-augmented airfoil 150 facilitates increasing the effectiveness of suction fan 100 by increasing the maximum pressure differential generated by the fan. Moreover, in the event debris, such as but not limited to dirt, dust, particles and the like, enters second hollow chamber 164, the orientation of outlet wall 168 facilitates ejecting the debris using centrifugal force. Specifically, the centrifugal force enables debris to be ejected from second hollow chamber 164 by traveling along outlet wall 168 and out of airfoil 150.

FIG. 4 is a perspective view of a propeller assembly 180. In the exemplary embodiment, propeller assembly 180 may include generally a propeller blade 182, which may include a hollow chamber 184. In one embodiment, propeller blade 182 may have a design substantially similar to airfoil 102, as shown in FIG. 2 and airfoil 150, as shown in FIG. 3. As a result, propeller blade 182 may be BLC-augmented to facilitate increasing the lift coefficient and pressure differential of propeller blade 182 in a manner similar to airfoils 102 and 150, as described above.

Figure 5:
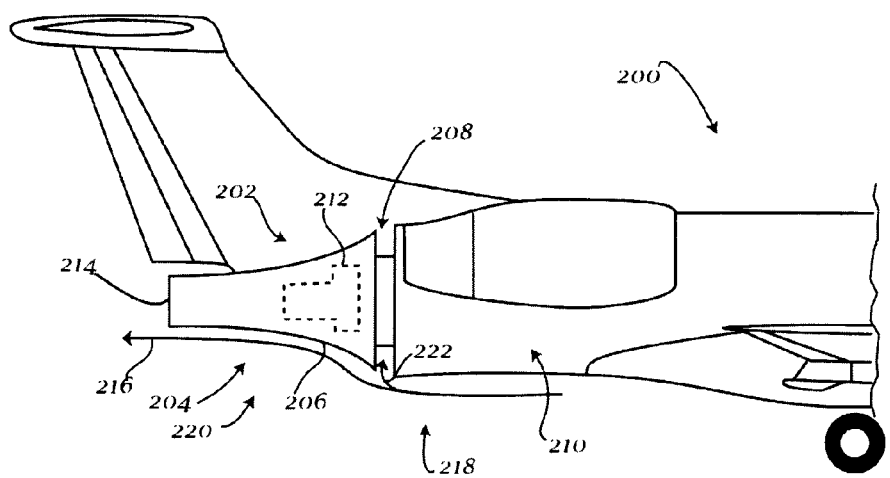
FIG. 5 is a side view of an aircraft that includes an exemplary BLC system.

FIG. 5 is an enlarged side view of an aircraft 200 that may include a BLC system 202 to facilitate exploiting the phenomenon of pressure thrust. In one embodiment, BLC system 202 may include a substantially conical tail cone 204 coupled to an aft portion of aircraft 200, wherein tail cone 204 includes a substantially concave surface 206. In the exemplary embodiment, aircraft 200 is a commercial airliner designed to carry passengers and/or cargo. In an alternative embodiment, aircraft 200 may be any type of aircraft known to a person having ordinary skill in the art, such as but not limited to military and/or civilian aircrafts. In the exemplary embodiment, tail cone 204 may be coupled to aircraft 200 such that an annular gap 208 is formed between tail cone 204 and a fuselage 210 of aircraft 200. In one embodiment, tail cone 204 may be substantially hollow and include a fan assembly 212 coupled therein. In one embodiment, fan assembly 212 may be substantially similar to fan assembly 180, as shown in FIG. 4. In an alternative embodiment, fan assembly 212 may be a turbofan, or any type of fan known to a person having ordinary skill in the art wherein the fan moves a substantially high volume of air and generates a substantially low pressure differential. In another alternative embodiment, fan assembly 212 may be any type of jet engine known to a person having ordinary skill in the art that enables BLC system 202 to function as described herein. In the exemplary embodiment, fan assembly 212, and more specifically a hollow interior of tail cone 204 may be in flow communication with annular gap 208. Tail cone 204 may also include an exhaust nozzle 214 defined in an aft portion of tail cone 204. In one embodiment, fan assembly 212 facilitates generating a low pressure differential that facilitate channeling air into gap 208 and further into fan assembly 212, such that the air is channeled out of exhaust nozzle 214, as described in more detail below.

During operation, aircraft 200 travels through the atmosphere, which facilitates channeling an airflow 216 over fuselage 210. In the exemplary embodiment, airflow 216 may include a boundary layer (not shown) that is positioned substantially near a surface of fuselage 210. The boundary layer air may flow at a slower velocity than airflow 216 because the boundary layer air is contacting fuselage 210. Moreover, as aircraft 200 travels through a fluid medium, such as air, airflow 216 passes over fuselage 210 near an aft portion 218 of fuselage 210 at a first velocity. As airflow 216 travels towards a tail cone portion 220, the velocity of airflow 216 may decrease, which facilitates increasing the local pressure substantially near tail cone 204, and more specifically concave surface 206. In the exemplary embodiment, BLC system 202 facilitates bending airflow 216 towards concave surface 206 such that the local pressure has a greater effect on tail cone 204, which facilitates exerting a force on tail cone 204 in a substantially forward direction, in accordance with the pressure thrust phenomenon.

Fan assembly 212 facilitates generating a low pressure differential within tail cone 204 that facilitates sucking, or channeling air from gap 208 through fan assembly 212. As a result, at least some air may be sucked from outside tail cone 204 through gap 208 into tail cone 204 and discharged out of exhaust nozzle 214. In such an embodiment, a first portion 222 of boundary layer air may be channeled into gap 208, which facilitates bending airflow 216 towards concave surface 206 of tail cone 204. This bending of airflow 216 facilitates increasing the lift coefficient and generating a higher pressure differential than an aircraft that does not include BLC system 202. As such, the high pressure substantially near concave surface 206 facilitates exerting a force on tail cone 204 which facilitates pushing tail cone 204 in a substantially forward direction. Therefore, in one embodiment, BLC system 202 facilitates decreasing the effect of drag on aircraft 200 by generating a force in a substantially forward direction by bending airflow 216 towards concave surface 206 of tail cone 204, which exploits the phenomenon of pressure thrust.

Figure 6:
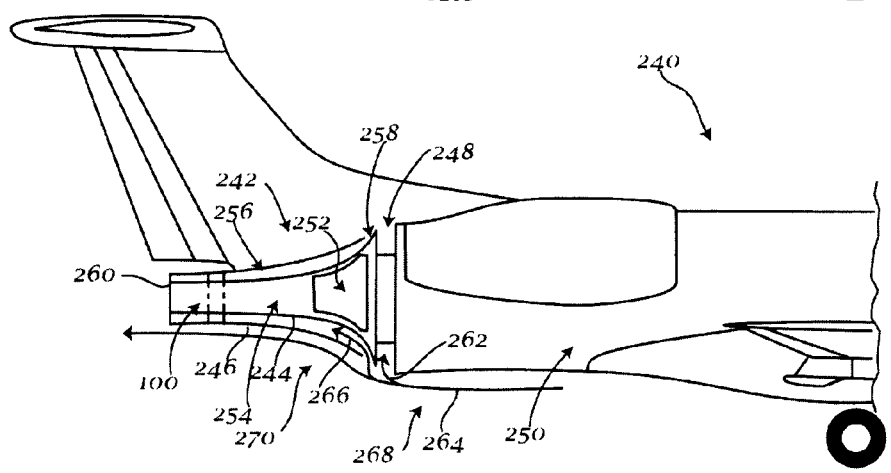
FIG. 6 is an enlarged partial cross-sectional view of an aircraft with an alternative BLC system.

FIG. 6 is an enlarged side view of an aircraft 240 that may include an alternative BLC system 242 to facilitate exploiting the phenomenon of pressure thrust with aircrafts traveling at high speeds such that the airflow has a velocity that is substantially higher than those generated by aircraft traveling at slower speeds. In one embodiment, BLC system 242 may include a substantially conical tail cone 244 coupled to an aft portion of aircraft 240, wherein tail cone 244 includes a radially outer substantially concave surface 246. In the exemplary embodiment, aircraft 240 is a commercial airliner designed to carry passengers and/or cargo. In an alternative embodiment, aircraft 240 may be any type of aircraft known to a person having ordinary skill in the art, such as but not limited to military and civilian aircrafts. In the exemplary embodiment, tail cone 244 may be coupled to aircraft 240 such that an annular gap 248 is formed between tail cone 244 and a fuselage 250 of aircraft 240. In one embodiment, tail cone 244 may be substantially hollow and include a fan assembly 252 coupled in a first hollow chamber 254, wherein fan assembly 252 may be substantially similar to fan assembly 212, as shown in FIG. 5.

Fan assembly 252, and more specifically first hollow chamber 254 of tail cone 244 may be in flow communication with annular gap 248. Moreover, tail cone 244 may include a second hollow chamber 256 positioned substantially radially away from first hollow chamber 254 such that a conical gap 258 may be defined therebetween. In one embodiment, suction fan 100 (as described in FIG. 1) may be coupled to tail cone 244 and positioned within conical gap 258. In an alternative embodiment, fan assembly 252 may facilitate providing suction for both annular gap 248 and conical gap 258. In the exemplary embodiment, suction fan 100 may be sized such that first hollow chamber 254 is positioned within aperture 112 (shown in FIG. 1) of suction fan 100. Tail cone 244 may also include an exhaust nozzle 260 defined in an aft portion of tail cone 244. In one embodiment, fan assembly 252 facilitates generating a low pressure differential that facilitates channeling a first portion 262 of an airflow 264 into annular gap 248 and further into fan assembly 252, such that first portion 262 air is channeled out of exhaust nozzle 260, as described in more detail below. Moreover, suction fan 100 facilitates generating another low pressure differential that facilitate channeling a second portion 266 of airflow 264 into conical gap 258 and discharges second portion air 266 out of exhaust nozzle 260, as described in more detail below.

During operation, aircraft 240 travels through the atmosphere, which facilitates channeling airflow 264 over fuselage 250. In the exemplary embodiment, airflow 264 may include a boundary layer (not shown) that is positioned substantially near a surface of fuselage 250. The boundary layer air may flow at a slower velocity than airflow 264 because the boundary layer air is contacting fuselage 250. Moreover, as aircraft 240 travels through a fluid medium, such as air, airflow 264 passes over fuselage 250 near an aft portion 268 of fuselage 250 at a first velocity. As airflow 264 travels towards a tail cone portion 270, the velocity of airflow 264 may decrease, which facilitates increasing the local pressure substantially near tail cone 244, and more specifically concave surface 246. In the exemplary embodiment, BLC system 242 facilitates bending airflow 264 towards concave surface 246 such that the local pressure has a greater effect on tail cone 244, which facilitates exerting a force on tail cone 244 in a substantially forward direction, in accordance with the pressure thrust phenomenon.

Fan assembly 252 facilitates generating a low pressure differential within first hollow chamber 254 that facilitates sucking, or channeling first portion air 262 through annular gap 248. As a result, at least some of airflow 264 may be sucked from outside tail cone 244 through annular gap 248 and into tail cone 244 and discharged out exhaust nozzle 260. In such an embodiment, first portion 262 of boundary layer air may be channeled into annular gap 248, which facilitates bending airflow 264 towards concave surface 246 of tail cone 244. In the exemplary embodiment, aircraft 240 may be traveling at high speeds such that an additional suction stage is required to bend airflow 264 towards concave surface 246. Accordingly, suction fan 100 facilitates moving a substantially low volume of air and generating a substantially high pressure differential within second hollow chamber 256 of tail cone 244 that facilitates sucking, or channeling second portion air 266 through conical gap 258. This second suction stage facilitates further bending airflow 264 towards concave surface 246, which facilitates increasing the lift coefficient and generating a higher pressure differential than an aircraft that does not include BLC system 242. As such, the high pressure substantially near concave surface 246 facilitates exerting a force on tail cone 244 which facilitates pushing tail cone 244 in a substantially forward direction. Therefore, in one embodiment, BLC system 242 facilitates decreasing the effect of drag on aircraft 240 by generating a force in a substantially forward direction by bending airflow 264 towards concave surface 246 of tail cone 244, which exploits the phenomenon of pressure thrust.

Figure 7:
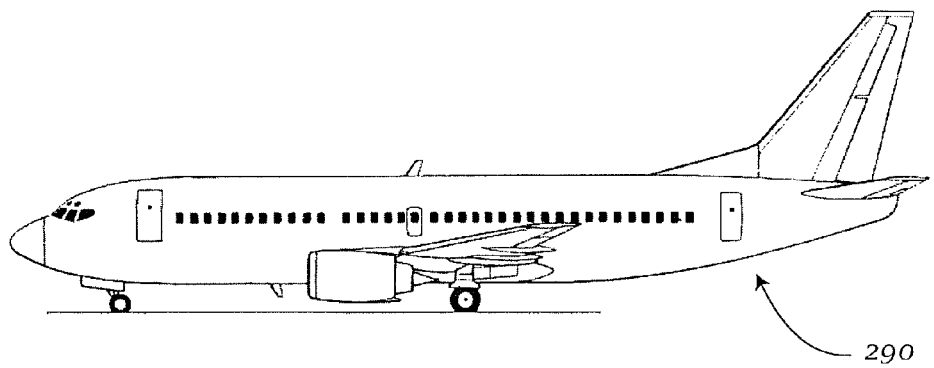
FIG. 7 is a profile view of an exemplary airliner.
Figure 8:
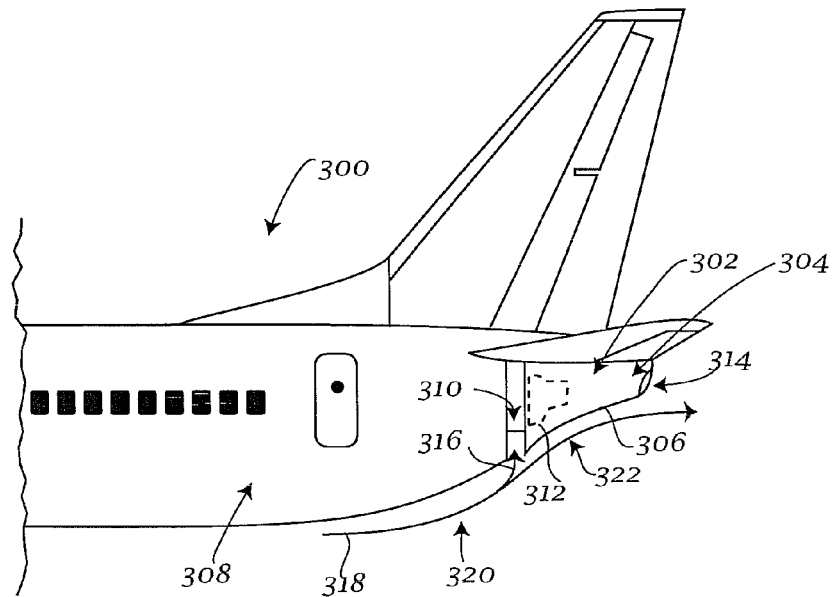
FIG. 8 is an enlarged side view of a BLC system that may be used with the aircraft shown in FIG. 7.

FIG. 7 is a side view of an exemplary jetliner 290. FIG. 8 is an enlarged side view of an aircraft 300 that may include an alternative BLC system 302 to facilitate exploiting the phenomenon of pressure thrust. Specifically, BLC system 302 facilitates exploiting the phenomenon of pressure thrust with aircrafts traveling at transonic speeds. As is well known in the art, transonic speeds are speeds that are substantially near the speed of sound. In one embodiment, transonic speeds may range between about 0.75 Mach to about Mach 1.2.

In one embodiment, BLC system 302 may include a substantially conical tail cone 304 coupled to an aft portion of aircraft 300, wherein tail cone 304 includes a substantially concave surface 306. Tail cone 304, and more specifically concave surface 306 may include a geometry that orients, or positions concave surface 306 with respect to a fuselage 308 to facilitate increasing the effectiveness of tail cone 304 in exploiting the pressure thrust of the shockwave. Moreover, tail cone 304 may be positioned with respect to fuselage 308, such that tail cone 304 facilitates increasing the effectiveness of the force generated by the shockwave on concave surface 306 of tail cone 304.

In the exemplary embodiment, aircraft 300 is a commercial airliner designed to carry passengers and/or cargo. In an alternative embodiment, aircraft 300 may be any type of aircraft known to a person having ordinary skill in the art, such as but not limited to military and civilian aircrafts. In the exemplary embodiment, tail cone 304 may be coupled to aircraft 300 such that an annular gap 310 is formed between tail cone 304 and a fuselage 308 of aircraft 300. In one embodiment, tail cone 304 may be substantially hollow and include a fan assembly 312 coupled in a hollow chamber, wherein fan assembly 312 may be substantially similar to fan assembly 212, as shown in FIG. 5. Fan assembly 312, and more specifically the hollow chamber of tail cone 304 may be in flow communication with annular gap 310. In an alternative embodiment, tail cone 304 may include at least one second hollow chamber (not shown) to form an additional suction stage as described in FIG. 6. In the exemplary embodiment, tail cone 304 may also include an exhaust nozzle 314 defined in an aft portion of tail cone 304. Fan assembly 312 may facilitate generating a low pressure differential that facilitates channeling a first portion 316 of an airflow 318 into gap 310 and further into fan assembly 312, such that first portion air 316 is channeled out of exhaust nozzle 314, as described in more detail below.

During operation, aircraft 300 travels through the atmosphere, which facilitates channeling airflow 318 over fuselage 308 at supersonic speeds, as described above. Moreover, airflow 318 may include a boundary layer (not shown) that is positioned substantially near a surface of fuselage 308. As aircraft 300 travels through a fluid medium, such as air, at transonic speeds, airflow 318 passes over fuselage 308. The airflow 318 traveling past fuselage 308 may be accelerated to a velocity greater than or substantially near Mach 1.0 such that an energized portion 320 of airflow 318 may flow past fuselage 308. As energized portion 320 of airflow 318 travels towards a tail cone portion, and more specifically concave surface 306 the velocity of airflow 318 may decrease resulting in a de-energized portion 322 of airflow 318, which facilitates generating a shockwave. The shockwave facilitates increasing the local pressure substantially near tail cone 304, and more specifically concave surface 306. In the exemplary embodiment, BLC system 302 facilitates bending airflow 318 towards concave surface 306 such that the shockwave that is produced is substantially near concave surface 306 and thus the local pressure has a greater effect on tail cone 304, which facilitates exerting a force on tail cone 304 in a substantially forward direction, in accordance with the pressure thrust phenomenon.

In one embodiment, fan assembly 312 facilitates generating a low pressure differential within the hollow chamber of tail cone 304 that facilitates sucking, or channeling first portion air 316 through gap 310. As a result, at least some of airflow 318 may be sucked from outside tail cone 304 through gap 310 and into tail cone 304 and discharged out exhaust nozzle 314. In such an embodiment, first portion 316 of boundary layer air may be channeled into gap 310, which facilitates bending airflow 318 towards concave surface 306 of tail cone 304. In an alternative embodiment, multiple suction stages may be used as describe above and in FIG. 6. As a result, the shockwave is bent substantially towards concave surface 306 which facilitates increasing the local pressure adjacent concave surface 306. As such, the high pressure substantially near concave surface 306 facilitates exerting a force on tail cone 304 which facilitates pushing tail cone 304 in a substantially forward direction. Therefore, in one embodiment, BLC system 302 facilitates decreasing the effect of drag on aircraft 300 by generating a force in a substantially forward direction by bending airflow 318, and more specifically the shockwave, towards concave surface 306 of tail cone 304.

Figure 9:
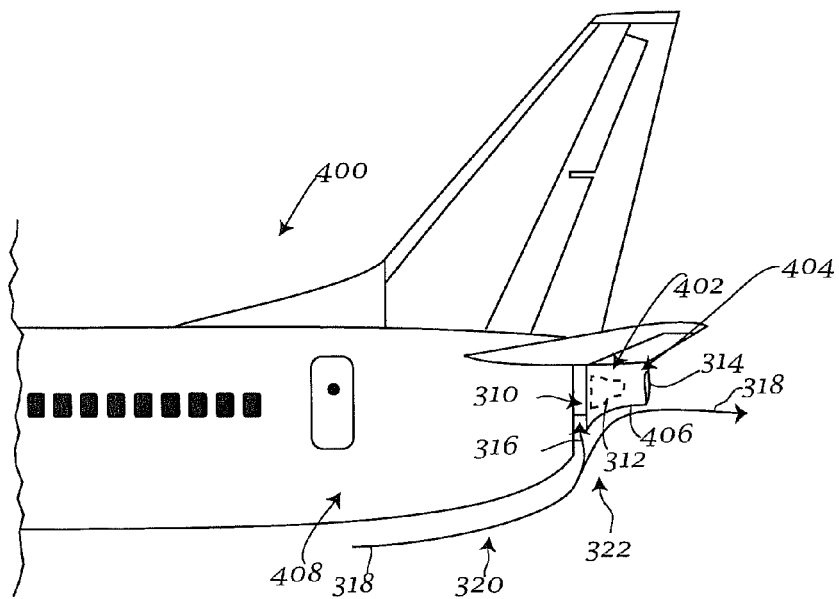
FIG. 9 is an enlarged side view of an alternative BLC system that may be used with the aircraft shown in FIG. 7.

FIG. 9 is an enlarged side view of an aircraft 400 that may include an alternative BLC system 402 to facilitate exploiting the phenomenon of pressure thrust. Specifically, BLC system 402 facilitates exploiting the phenomenon of pressure thrust with aircrafts traveling at transonic speeds. In one embodiment, transonic speeds may range between about 0.75 Mach to about Mach 1.2. Specifically, BLC system 402 may include a substantially conical tail cone 404 coupled to an aft portion of aircraft 400, wherein tail cone 404 includes a substantially concave surface 406. In the exemplary embodiment, tail cone 404 has a geometry and orientation that are designed to take advantage of shockwaves. In the exemplary embodiment, tail cone 404 and BLC system 402 are substantially similar to tail cone 304 and BLC system 302, respectively. As such, like components in FIG. 9 will be numbered with like reference characters. In the exemplary embodiment, tail cone 404 is positioned higher with respect to a fuselage 408 than tail cone 304. Moreover, concave surface 406 is oriented and has a geometry to facilitate increasing the effectiveness of the force generated by the shockwaves. Tail cone 404 and BLC 402 may operate substantially similar to tail cone 304 and BLC system 302 described in FIG. 8 above.

Figure 10:
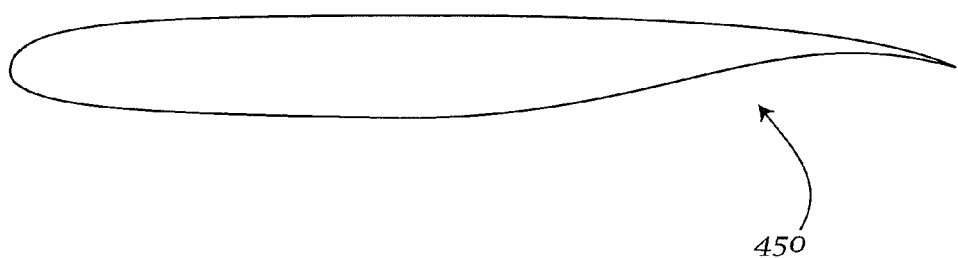
FIG. 10 is a profile view of an alternative airfoil that may be used with the aircraft shown in FIG. 7.
Figure 11:
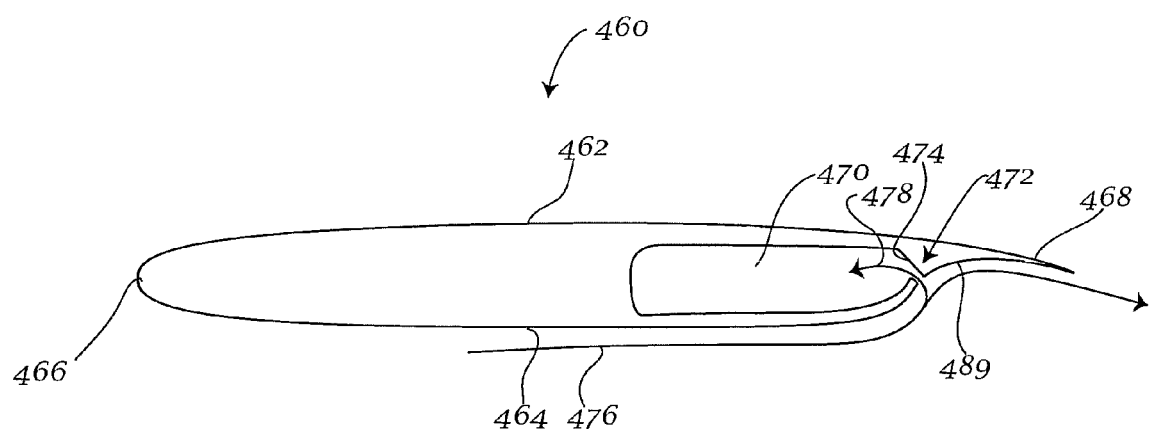
FIG. 11 is a cross-sectional view of an alternative airfoil that may be used with the aircraft shown in FIG. 7.

FIG. 10 is a side view of an airfoil 450 that may be used with an aircraft, such as aircraft 290 shown in FIG. 7. FIG. 11 is an alternative airfoil 460 of airfoil 450 shown in FIG. 10. In the exemplary embodiment, airfoil 460 may be, but not limited to, a wing on an aircraft. In an alternative embodiment, airfoil 460 may be used on any craft known to a person having ordinary skill in the art wherein the craft travels through a fluid medium. In the exemplary embodiment, airfoil 460 may include a first surface 462 and a second surface 464, wherein first surface 462 defines a suction side of each airfoil 460, and second surface 464 defines a pressure side of each airfoil 460. First and second surfaces 462 and 464 may be coupled together at a leading edge 466 and at a radially-spaced trailing edge 468. In one embodiment, second surface 464 may include a concave surface 469 positioned substantially near trailing edge 466. Airfoil 460 may also have a hollow chamber 470 defined therein and positioned substantially adjacent trailing edge 468. In one embodiment, hollow chamber 470 may include a suction inlet 472 that is coupled in fluid communication with hollow chamber 470. Hollow chamber 470 may be coupled in flow communication with pressure source 114 such that pressure source 114 facilitates channeling air from hollow chamber 470 towards pressure source 114. As a result, air may be sucked in from outside airfoil 460, substantially near first surface 462. Suction inlet 472 may also include an inlet wall 474 that is sloped at an angle with respect to first surface 462, wherein inlet wall 474 facilitates ejecting foreign objects using centrifugal force, as described in more detail below.

During operation, an airflow 476 is channeled from leading edge 466 to trailing edge 468. In an alternative embodiment, airflow 476 may be a flow of any type of fluid such as but not limited to, air, liquid and plasma. In the exemplary embodiment, airflow 476 passes over first and second surfaces 462 and 464 such that a substantially low pressure zone is created substantially near first surface 462 and a substantially high pressure zone is created substantially near second surface 464. Airflow 476 may include a boundary layer (not shown) of airflow 476 that is positioned substantially near second surface 464. The boundary layer air may flow at a slower velocity with respect to airflow 476 because the boundary layer air is contacting second surface 464. Moreover, in one embodiment, as airflow 476 travels towards concave surface 469, the velocity of airflow 476 may decrease, which facilitates increasing the local pressure substantially near concave surface 469.

Pressure source 114 facilitates generating a negative pressure area within hollow chamber 470 that facilitates sucking air from hollow chamber 470 towards pressure source 114. As a result, air may be sucked, or channeled from outside airfoil 102 through suction inlet 472 into hollow chamber 470 and towards pressure source 114. In such an embodiment, a first portion 478 of the boundary layer air may be channeled into suction inlet 472. The removal of first portion 478 of the boundary layer air facilitates bending airflow 476 towards trailing edge 468, and more specifically concave surface 469 such that the local pressure has a greater effect on concave surface 469, which facilitates exerting a force on concave surface 469 in a substantially forward direction, in accordance with the pressure thrust phenomenon.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A fuselage boundary layer control system comprising:
an aircraft comprising a fuselage;
a tail cone having a substantially conical shape and coupled to said fuselage such that an inlet is defined between said tail cone and said fuselage, said tail cone comprising:
a first surface having a substantially concave shape relative to an airflow passing over said fuselage; and
a hollow chamber defined in said tail cone;
a pressure source coupled to said tail cone and positioned within said hollow chamber, said pressure source coupled in flow communication with said inlet
a second surface having a substantially concave shape and positioned a radial distance from said first surface such that a second hollow chamber is defined between said first surface and said second surface; and
a conical aperture defined in said tail cone and in flow communication with said second hollow chamber.

2. The fuselage boundary layer control system of claim 1 further comprising an exhaust nozzle defined in said tail cone and coupled in flow communication with said hollow chamber.

3. The fuselage boundary layer control system of claim 1 wherein said pressure source comprises at least one of a jet engine, a fan assembly and a turbofan.

4. The fuselage boundary layer control system of claim 1 wherein said first surface is positioned with respect to an aft portion of said fuselage to facilitate increasing pressure thrust on said first surface.

5. The fuselage boundary layer control system of claim 1 further comprising a second pressure source coupled to said tail cone and positioned within second hollow chamber.

6. The fuselage boundary layer control system of claim 5 wherein said second pressure source comprises at least one of a jet engine, a fan assembly, a pressure fan and a turbofan.

* * * * *